United States Patent
Subramanian et al.

(10) Patent No.: US 9,727,925 B2
(45) Date of Patent: Aug. 8, 2017

(54) METHOD AND SYSTEM FOR IMPLEMENTING SEMANTIC ANALYSIS OF INTERNAL SOCIAL NETWORK CONTENT

(71) Applicant: Oracle International Corporation, Redwood Shores, CA (US)

(72) Inventors: Srividhya Subramanian, Los Altos, CA (US); Mary E. G. Bear, Burlingame, CA (US); Mehrshad Setayesh, Lafayette, CO (US); Noah Horton, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 160 days.

(21) Appl. No.: 14/021,798

(22) Filed: Sep. 9, 2013

(65) Prior Publication Data

US 2014/0074844 A1 Mar. 13, 2014

Related U.S. Application Data

(60) Provisional application No. 61/698,715, filed on Sep. 9, 2012, provisional application No. 61/780,562, filed on Mar. 13, 2013, provisional application No. 61/698,713, filed on Sep. 9, 2012, provisional application No. 61/780,611, filed on Mar. 13, 2013.

(51) Int. Cl.
| | | |
|---|---|---|
| *G06F 7/04* | (2006.01) |
| *G06F 17/30* | (2006.01) |
| *G06Q 50/00* | (2012.01) |
| *G06Q 30/02* | (2012.01) |
| *G06F 17/27* | (2006.01) |
| *H04L 29/08* | (2006.01) |
| *G06Q 10/10* | (2012.01) |

(52) U.S. Cl.
CPC ......... *G06Q 50/01* (2013.01); *G06F 17/2785* (2013.01); *G06F 17/30598* (2013.01); *G06F 17/30864* (2013.01); *G06Q 10/10* (2013.01); *G06Q 30/0201* (2013.01); *H04L 67/12* (2013.01); *H04L 67/306* (2013.01)

(58) Field of Classification Search
CPC ............... G06F 17/30; G06F 17/30864; G06F 17/2785; H04L 67/12; H04L 51/32; H04L 67/306; G06Q 10/06; G06Q 50/01
See application file for complete search history.

(56) References Cited

U.S. PATENT DOCUMENTS

| | | |
|---|---|---|
| 7,974,983 B2 | 7/2011 | Goeldi |
| 8,312,056 B1 | 11/2012 | Peng et al. |

(Continued)

OTHER PUBLICATIONS

Third-Party Submission under 37 CFR 1.290 filed Apr. 3, 2014 for related U.S. Appl. No. 14/021,820.

(Continued)

*Primary Examiner* — Bruce Moser
(74) *Attorney, Agent, or Firm* — Vista IP Law Group, LLP

(57) ABSTRACT

Disclosed is a method, system, and computer program product for semantically analyzing the content within an internal social network. Using the results of the analysis, the executives can gain a better understanding of, and insight into, the organization and its employees. A dashboard tool may be used in some embodiments of the invention to visualize the results of the semantic analysis.

34 Claims, 8 Drawing Sheets

(56) References Cited

U.S. PATENT DOCUMENTS

| | | |
|---|---|---|
| 8,447,852 B1 | 5/2013 | Penumaka |
| 8,473,422 B2 † | 6/2013 | Shen |
| 8,554,635 B2 | 10/2013 | England |
| 8,635,674 B2 † | 1/2014 | Bhatia |
| 8,706,548 B1 | 4/2014 | Blume et al. |
| 8,856,056 B2 | 10/2014 | Di Sciullo |
| 8,856,165 B1 | 10/2014 | Cierniak |
| 9,117,058 B1 | 8/2015 | Ansari et al. |
| 2006/0173957 A1* | 8/2006 | Robinson ............ G06Q 10/10 709/204 |
| 2006/0282328 A1 | 12/2006 | Gerace et al. |
| 2007/0067210 A1 | 3/2007 | Rishell et al. |
| 2007/0100779 A1 | 5/2007 | Levy et al. |
| 2007/0121843 A1 | 5/2007 | Atazky et al. |
| 2007/0124432 A1 | 5/2007 | Holtzman |
| 2007/0150335 A1 | 6/2007 | Arnett et al. |
| 2008/0294624 A1 | 11/2008 | Kanigsberg |
| 2008/0313000 A1 † | 12/2008 | Degeratu et al. |
| 2009/0012760 A1* | 1/2009 | Schunemann ........ G06Q 10/06 703/6 |
| 2009/0112841 A1* | 4/2009 | Devarakonda .... G06F 17/30731 |
| 2009/0157511 A1 | 6/2009 | Spinnell |
| 2009/0172773 A1* | 7/2009 | Moore ............. G06F 17/3089 726/1 |
| 2009/0254529 A1 | 10/2009 | Goldentouch |
| 2009/0265221 A1 | 10/2009 | Woods et al. |
| 2010/0070517 A1 | 3/2010 | Ghosh et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0306049 A1 | 12/2010 | Kakade et al. |
| 2011/0055017 A1 | 3/2011 | Solomon et al. |
| 2011/0112899 A1 | 5/2011 | Strutton |
| 2011/0125550 A1 | 5/2011 | Erhart |
| 2011/0145064 A1 | 6/2011 | Anderson et al. |
| 2011/0179061 A1* | 7/2011 | Chilakamarri ........ G06Q 10/00 707/769 |
| 2011/0191417 A1 | 8/2011 | Rathod |
| 2011/0258560 A1 | 10/2011 | Mercuri et al. |
| 2011/0270649 A1 | 11/2011 | Kerho |
| 2011/0313996 A1 | 12/2011 | Strauss |
| 2011/0320542 A1* | 12/2011 | Bendel ................. G06F 17/274 709/206 |
| 2012/0036006 A1 | 2/2012 | Mauro |
| 2012/0185764 A1 | 7/2012 | Ball et al. |
| 2013/0014137 A1 | 1/2013 | Bhatia |
| 2013/0060864 A1* | 3/2013 | Ehms ..................... H04L 51/14 709/206 |
| 2013/0080264 A1 | 3/2013 | Umeda |
| 2013/0291060 A1 | 10/2013 | Moore |
| 2013/0325733 A1 | 12/2013 | Wu et al. |
| 2014/0074551 A1 | 3/2014 | Setayesh et al. |
| 2014/0082070 A1 | 3/2014 | Chakraborty et al. |
| 2014/0114959 A1* | 4/2014 | Sankhla ........... G06F 17/30699 707/722 |
| 2014/0173643 A1 | 6/2014 | Bhatia |
| 2014/0180788 A1 | 6/2014 | George et al. |
| 2016/0063442 A1 | 3/2016 | Bennett et al. |

OTHER PUBLICATIONS

Non-final Office Action dated Jan. 16, 2015 for related U.S. Appl. No. 14/040,565.

Final Office Action dated May 5, 2015 for related U.S. Appl. No. 14/040,565.

Non-final Office Action dated Dec. 30, 2015 for related U.S. Appl. No. 14/040,565.

Final Office Action dated Jun. 17, 2016 for related U.S. Appl. No. 14/040,565.

Notice of Allowance and Fee(s) due dated Nov. 30, 2016 for related U.S. Appl. No. 14/040 565.

Non-final Office Action dated Aug. 11, 2016 for related U.S. Appl. No. 14/021,820.

\* cited by examiner
† cited by third party

| Title | Link | Source | Source Type | Date | Message Text | Message Quality | Tag | Name / Contact | Social Profile / Demographic Information |
|---|---|---|---|---|---|---|---|---|---|
| 308 | 310 | 312 | 314 | 316 | 318 | 320 | 322 | 324 | 326 |
| Bad Customer Service | http://blog site/1234 | Blogsite | Microblog | 1/1/2014 | "I received bad service from a salesperson at Foo.com" | Readability = High; Subjectivity = 1; Tonality = 1 | Customer Service | Joe | Follower Count = 1000 |
| Need TV | http://face _my_boo k_space. com/2345 | Face_My_b ook_space | Social media site | 1/2/2014 | "I need to buy a TV – does Foo.com have good prices?" | Readability = Medium; Subjectivity = 2; Tonality = 2 | Sales Lead | Sue | Lives in California |
|  |  |  |  |  |  |  |  |  |  |

FIG. 3

METHOD AND SYSTEM FOR IMPLEMENTING SEMANTIC ANALYSIS OF INTERNAL SOCIAL NETWORK CONTENT

CROSS-REFERENCE TO RELATED APPLICATIONS

The present application claims the benefit of U.S. Provisional Ser. No. 61/698,715, filed on Sep. 9, 2012, U.S. Provisional Ser. No. 61/780,562, filed on Mar. 13, 2013, U.S. Provisional Ser. No. 61/698,713, filed on Sep. 9, 2012, and U.S. Provisional Ser. No. 61/780,611, filed on Mar. 13, 2013, all of which are hereby incorporated by reference in their entirety. The present application is related to U.S. patent application Ser. No. 14/021,820, filed on even date herewith, entitled "METHOD AND SYSTEM FOR IMPLEMENTING A SOCIAL MEDIA MARKETING AND ENGAGEMENT APPLICATION", which is hereby incorporated by reference in its entirety

BACKGROUND AND SUMMARY

Given the widespread availability and usage of the internet by consumers, many businesses have become interested in being able to effectively monitor the content and commentary provided by such consumers. Interactive websites such as social networks and blogs provide a wealth of useful information that can be advantageously used by a business.

It would be very useful to provide an effective mechanism to allow businesses and enterprise business applications to interact with and take action upon data that originate from online sources of social data and commentary. For example, consider a CRM (Customer Relationship Management) application, which is designed to facilitate the ability of a business to create, develop, and build relationships with its customers or potential customers. It would be very desirable to allow the business CRM application to stay informed of actionable social networking content, for example, to identify potential customers and possible sales leads.

As another example, brand managers are often interested in monitoring commentary on the internet regarding their brands or competitors' brands. Brand managers may read the commentary to gauge interest in their marketing materials, receive feedback regarding their products, or take further action regarding any inflammatory postings.

Embodiments of the present invention provide a system, method, and computer program product for allowing a business entity to access and integrate with social media data. The invention is capable of accessing data across multiple types of internet-based sources of social data and commentary and to perform semantic analysis upon that data. Tags are associated with the analyzed content that pertain to actionable categorization of the data. Community managers can then view and take action with respect to the data. In addition, enterprise business applications can utilize the tagged data to perform business processing.

Embodiments of the invention also provide a method, system, and computer program product for semantically analyzing the content within an internal social network. Using the results of the analysis, the executives can gain a better understanding of, and insight into, the organization and its employees. A dashboard tool may be used in some embodiments of the invention to visualize the results of the semantic analysis.

Other additional objects, features, and advantages of the invention are described in the detailed description, figures, and claims.

BRIEF DESCRIPTION OF FIGURES

FIG. 3 shows a table of example types of information that may be part of an actionable social message.

DETAILED DESCRIPTION

The present disclosure is directed to an approach for allowing a business entity to access and integrate with social media data. The invention is capable of accessing data across multiple types of internet-based sources of social data and commentary and to perform semantic analysis upon that data. Tags are associated with the analyzed content that pertain to actionable categorization of the data. Users can then view and take action with respect to the data. In addition, enterprise business applications can utilize the tagged data to perform business processing.

Figure 1:
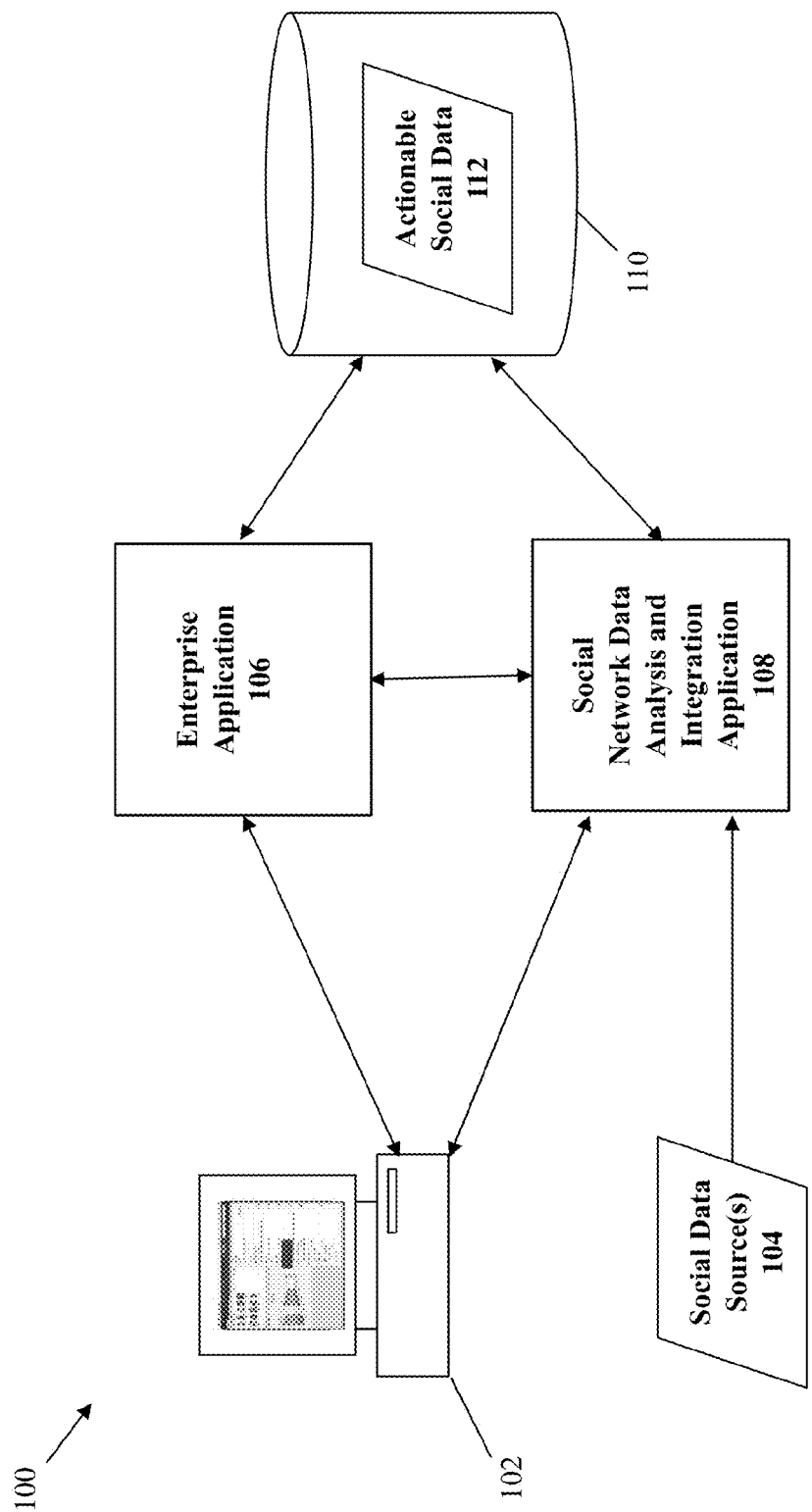
FIG. 1 illustrates an example system which may be employed in some embodiments of the invention to implement analysis and integration of social media data with enterprises and enterprise applications.

FIG. 1 illustrates an example system 100 which may be employed in some embodiments of the invention to implement analysis and integration of social media data with enterprises and enterprise applications. The system 100 includes one or more users at one or more user stations 102 that use the system 100 to operate the enterprise application 106 and the social network data analysis and integration application 108. The user station 102 comprises any type of computing station that may be used to operate or interface with the applications 106/108 in the system 100. Examples of such user stations include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface to generate user inputs to the enterprise application and/or social networking application.

According to some embodiments, integration is provided between an enterprise application 106 and a social networking application. For the purposes of explanation, one or more embodiments are illustratively described with reference to CRM applications as enterprise application 106. It is noted, however, that the invention may be applied to other types of enterprise applications as well, and is not to be limited to CRM applications unless explicitly claimed as such.

The enterprise application 106 comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite, JD Edwards Enterprise One, Oracle Cloud, PeopleSoft, and Siebel all of which are available from Oracle Corporation of Redwood Shores, Calif.

The social data integration and analysis application 108 provides a framework for performing social media marketing and engagement activities. The social data integration and analysis application 106 receives data from one or more online social data sources 104. Such social data sources include, for example, websites such as a social network or blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Semantic filtering and analysis is performed upon the social data. Based upon this analysis, rich-content tags are associated with the content to create actionable social data 112. The actionable social data 112 is used by any users (such as community managers), e.g., to view and respond to messages. In addition, messages can be dispatched to the enterprise application(s) based at least in part upon the tags. The enterprise application can then use the messages to perform further business processing.

The actionable social data 112 is stored into a database in a computer readable storage device 110. The computer readable storage device 110 comprises any combination of hardware and software that allows for ready access to the data that is located at the computer readable storage device. For example, the computer readable storage device 110 could be implemented as computer memory operatively managed by an operating system. The computer readable storage device 110 could also be implemented as an electronic database system having storage on persistent and/or non-persistent storage.

Figure 2:
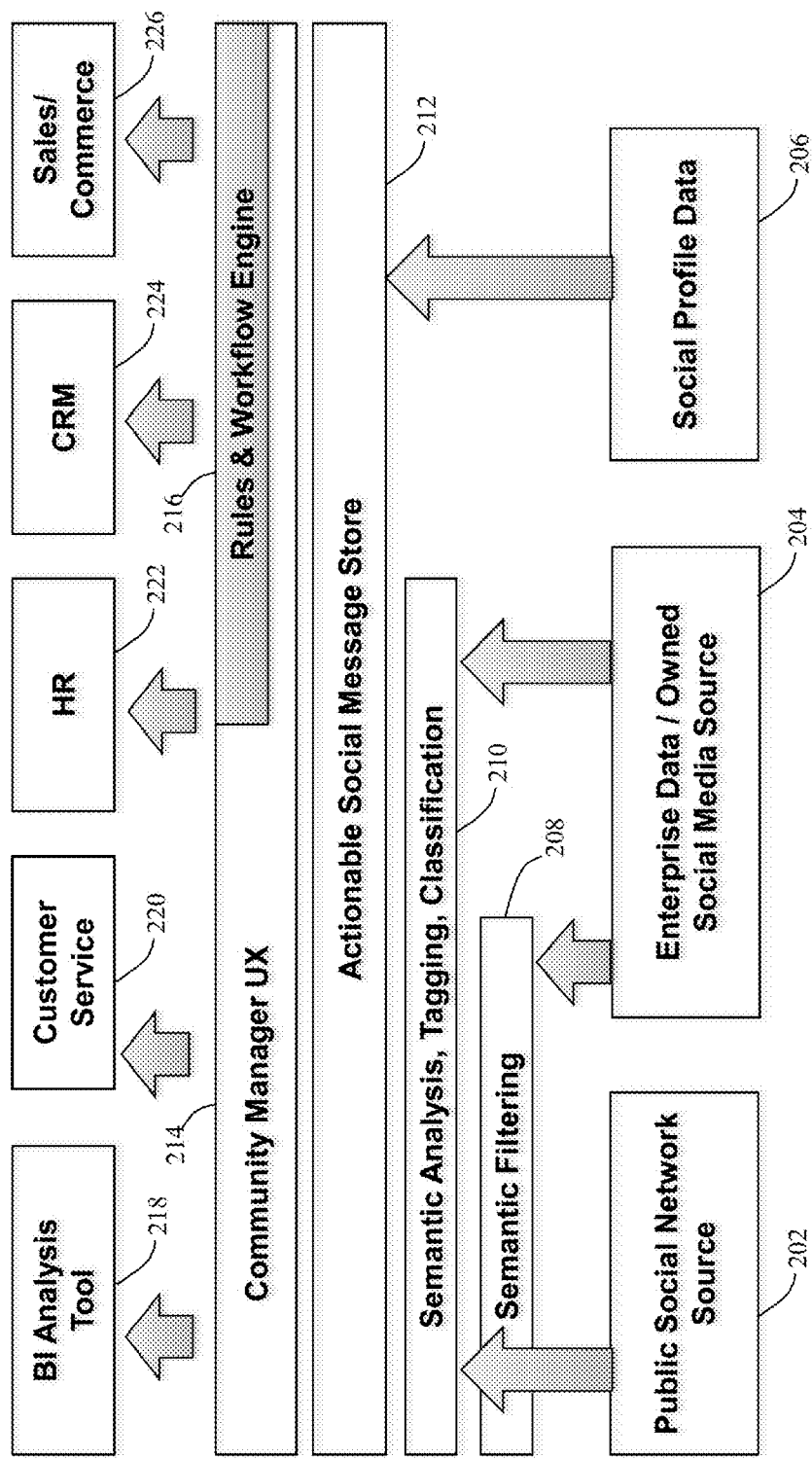
FIG. 2 shows an architecture for implementing a social media marketing and engagement framework according to some embodiments of the invention.

FIG. 2 shows an architecture for implementing a social media marketing and engagement framework according to some embodiments of the invention. Data from one or more social network systems are received into the system. The social data may be either public social network sources 202 or private social network sources 204. Public social network data/messages include, for example, publically available content from public blog sites, twitter messages, RSS data, and social media sites such as Facebook. Private social network data/messages include, for example, content from internal company social networking sites.

In some embodiments, the data that is received for processing includes non-social data. Such data includes, for example, enterprise data from the non-public sources 204, such as, email, chats, transcribed phone conversations, transcribed videos.

Semantic analysis is performed upon the received data. For example, latent semantic analysis (LSA), an advanced form of statistical language modeling, can be used to perform semantic analysis upon the social data. This permits the system to understand the contextual and semantic significance of terms that appear within the social data. This type of analysis can be used, for example, to understand the difference between the term "Galaxy" used for an astronomy contexts and "Galaxy" the name of a professional soccer team.

Semantic filtering 208 is a mechanism that is provided to minimize miss-categorizations of the social data. Much of the social data is likely to contain content which is of very little interest to a business organization. Semantic filtering is used to remove the irrelevant material from the social data to reduce the occurrence of false positives, false negatives, and inappropriate responses/rejections within the actionable data. This permits the resulting data to be more relevant and accurate when provided to the enterprise applications.

In some embodiments, all social data content is subject to semantic filtering to reduce the excess "noise" of irrelevant data. In an alternate embodiment, only public social network content undergoes semantic filtering, such that the private social network content is not subject to the semantic filtering. This embodiment is based on the assumption that the public social network content is more likely to contain data of little interest to the enterprise. In yet another embodiment, both the public and private social network data are subject to semantic filtering, but the filtering is handled differently so that greater levels/intensity of filtering is imposed on the public data as opposed to the private data.

The system performs semantic analysis and classification 212 to the social media data. This permits the system to create and apply filters to identify themes, and to cluster together like-minded messages, topics, conversations, and content. There are numerous ways that can be taken to semantically categorize the social network content. The categorizations and classifications can be performed with an eye towards identifying, for example: (a) customer insights, preferences, and intentions; (b) demographic and social platform information; (c) industry and category trends and emerging themes; and/or (d) customer/consumer viewpoints, e.g., on price and product considerations, intent to switch services, and customer satisfaction. Other categorizations and/or classifications for performing auto-categorizations include, for example, items such as "intent to switch", "customer satisfaction", "brand influencer", "passive job candidate", "active job candidate", and "brand detractor".

Based upon the semantic analysis and classification, tags are identified and associated with the social network content. The tags correspond to areas of analytical importance with respect to the organizations that will be consuming the results of the system. For example, a business may seek to use the system to analyze social network data to identify: (1) sales leads; (2) customer relations issues and dissatisfied customers; (3) potential job candidates; and (4) HR topics. If these are the business' goals, then at least some of the tags associated with the classified social media content will, in some embodiments, correspond to identification of the content that pertain to these categories.

Social profile data 206 may also be accessed and associated with the originator of specific items of social network content. This profile data includes, for example, information about the social "importance" of that person, e.g., using Klout data and/or follower count. The profile data 206 may also include demographic information about the person, including information about the person's income, age, profession, and geographic location. This profile data is useful for many purposes. For example, messages created by a person having a very high Klout score or who has many followers may need to be placed onto a higher priority queue for processing. As another example, the demographic information can be used to direct a sales lead to the appropriate sales department, e.g., a sales lead associated with a person in California may be directed to a west coast sales representative while a sales lead from New York may be directed to an east coast sales representative.

When analyzing internal social data, employee profile data may also be accessed used as part of the analysis for the internal social network content. When the person in an employee there is additional profile information that may exist for the individual (e.g., organization information—who is the manager/employee, job function, job level, peer group, location, etc.). As noted above, external influence may be analyzed, e.g., using a Klout score. Similarly, internal influence can similarly be analyzed, tracked, and/or leveraged using various data points, e.g., based at least in part on job role, responsibility, title, number of employees managed by person, and/or number of individuals in that person's organizational hierarchy.

The resulting set of data is the set of actionable social messages that is stored in an actionable social message store 212. FIG. 3 shows a table 302 of some example types of information that may be part of the actionable social message. Column 308 identifies a title for the message, e.g., based upon the "subject" or "topic" parameter associated with a given social media message. Column 310 identifies an internet/web link/address for the message. Column 312 identifies the specific source of the message. Column 314 identifies the type of the message source. Column 316 provides the date that s associated with the message. Column 318 provides some or all of the text associated with the message. Column 320 provides messaged quality data for the message, e.g., data regarding the readability, subjectivity, and/or tonality of the message. Column 324 identifies the name/contact that is associated with the message. Column 326 identifies any additional relevant social profile data that may be associated with the message and/or message originator.

Column 322 identifies the one or more tags that may be assigned to the message. As described above, semantic analysis and classification may be performed on the message to identify any tag(s) that should be identified and associated with the social network content. For example, row 304 corresponds to social message content that appears quite relevant to the customer service of the organization being commented upon (e.g., commenting upon bad customer service from foo.com as described in Column 318). Therefore, this message will be associated with the appropriate tag (e.g., "Customer Service") that corresponds to this area of importance to the organization that will be consuming the results of the system (e.g., the organization being commented upon in the message as having bad customer service).

As another example, row 306 corresponds to social message content that discusses the desire to purchase a consumer item (e.g., a desire to purchase a television from the foo.com organization as described in Column 318). Therefore, this message will be associated with the appropriate tag (e.g., "Sales Lead") that corresponds to this area of importance to the organization (e.g., foo.com) that will be consuming the results of the actionable message.

Returning back to FIG. 2, the actionable social messages are placed into an actionable social message store 212. In some embodiments, this actionable social message store 212 provides canonical storage for social content that business vertical systems can access.

A user interface 214 is provided to permit users to view and act upon the data within the actionable social message store. For example, a Community Manager UX (user experience) can be provided as the user interface 214. Using the Community Manager UX, a user can direct the flow of messages to appropriate personnel to take responsibility for performing pertinent actions with the messages in the actionable social message store. For example, actionable social messages that are tagged as a "Sales Lead" can be directed to sale personnel to contact the message originator to make a sale. Similarly, actionable social messages that are tagged as a "Customer Relations" can be directed to customer relations personnel to contact the customer, e.g., to have retention department personnel convince a dissatisfied customer avoid changing service providers. Co-pending U.S. application Ser. No. 13/004,796, filed on Jan. 11, 2011, discloses an illustrative example of a Community Manager that can be employed in some embodiments of the invention, which is hereby incorporated by reference in its entirety.

The messages within the actionable social message store can be processed using any suitable processing mechanism. In one embodiment, manual processing is performed, whereby a user reviews the actionable social messages and manually takes action to direct the message to the appropriate destination. In an alternate embodiment, automated processing is performed using a rules and workflow engine. In this approach, a set of rules is provided in a rulebase, where the rules identify how the messages should be handled and directed within the organization. The rulebase can be constructed as a learning system, where feedback and a neural network algorithm are used to improve the handling of messages based upon looking at the results from past handling of messages.

The system then dispatches and/or creates the appropriate messages to be sent to destinations within the enterprise. For example, tickets can be sent to a social customer service tool 220, such as the RightNow cloud-based customer service product available from Oracle Corporation. As another example, the identity of possible employment candidates can be sent to an HR department/HR application 222. In addition, opportunities can be provided to a CRM system 224, where a record is automatically created and/or process in the system for the sales lead. Product data and comments can be provided to ecommerce tools 226, products, and groups, e.g., to the ATG product available from Oracle Corporation. An analysis tool/dashboard 218 (e.g., a business intelligence dashboard) may be provided over the actionable social messages to provide visibility by company decision makers using the analyzed data.

The messages to these vertical applications are dispatched based at least in part upon the tags that are associated with the data in the actionable social message store. When the other system takes action upon receiving the messages, then in some embodiments an update is provided in the actionable social message store with the update status of the message.

The system shown in FIG. 2 therefore provides a framework for integrating any part of a corporate infrastructure to handle social media data. When any new social media source is identified, then the inventive system can access and process that data like any of the other social data already being accessed—transparent to the corporate infrastructure that will eventually consume the results of that analysis. In addition, any new components/applications to the corporate infrastructure can be easily integrated, by configuring the rules within the Community Manager to address workflow paths to that new component/application.

Figure 4A:
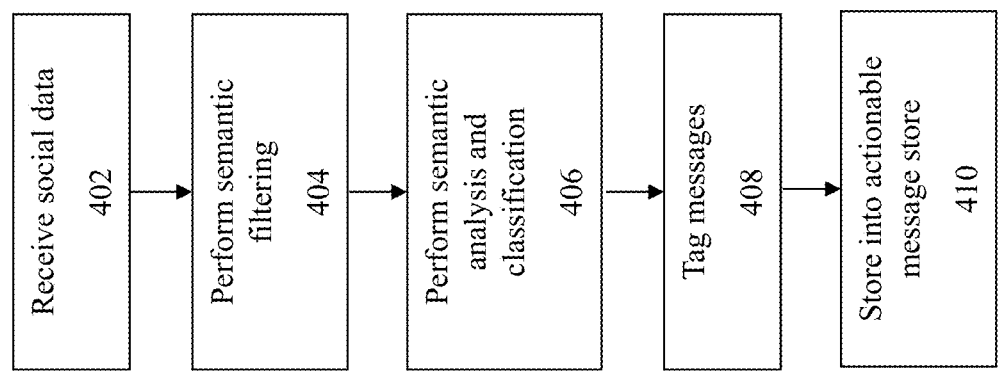
FIGS. 4A and 4B show flowcharts of approaches to implement some embodiments of the invention.
Figure 4B:
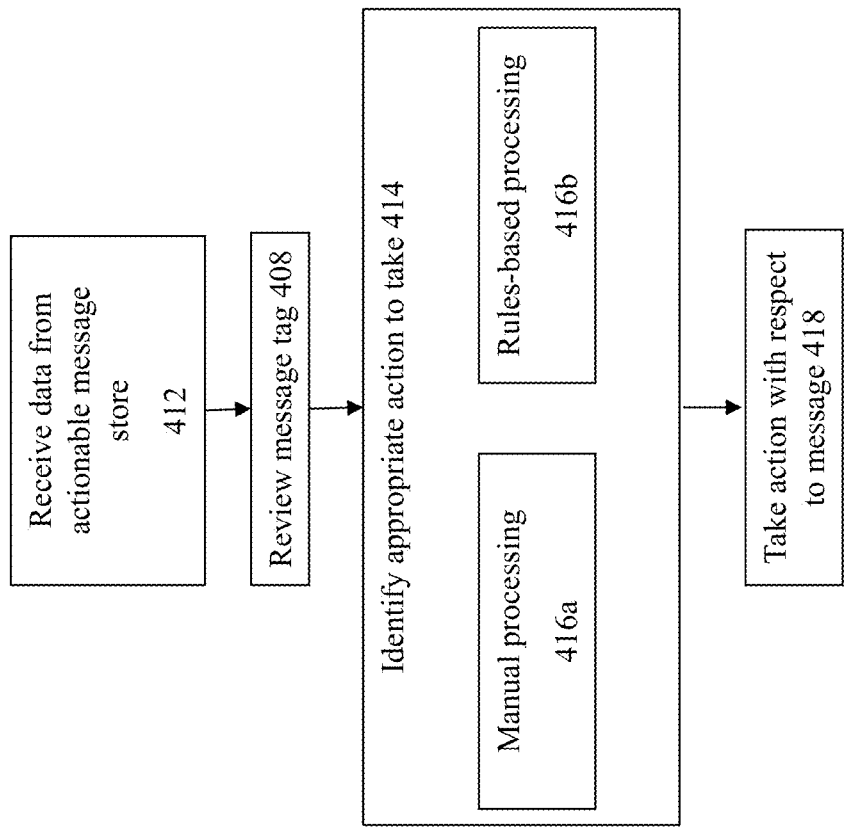

FIGS. 4A and 4B show flowcharts of approaches to implement some embodiments of the invention. At 402, the social data is received. As noted above, the social data may be received from any suitable source of the data, including both public and private sources of social media data.

At 404, semantic filtering is performed upon the social data. The filtering may be applied to some or all of the data. In some embodiments, different levels of filtering may be applied to different types and/or sources of data. For example, different levels of filtering may be applied depending upon whether the social data is public social data or private social data.

At 406, semantic analysis and classification is performed on the social media data. Based upon the results of the semantic analysis and classification, tags are identified and are associated with the messages/content, at 408. Thereafter, at 410, the actionable social messages are stored into an actionable social message store.

At 412, the data within the actionable social message store is retrieved for processing. The message tag is reviewed at 408. At 414, identification is made of the appropriate action to take with regards to the message.

Different approaches can be taken to process the messages in the actionable social message store. In the approach of 416a, manual processing is performed such that a user reviews the actionable social messages and manually takes action to direct the message to the appropriate destination. In the approach of 416b, automated processing is performed using a rules and workflow engine, where a set of rules is provided in a rulebase. The rules identify how the messages should be handled and directed within the organization.

Thereafter, at 418, the appropriate action is taken with respect to the message. For example, tickets can be sent to a social customer service cloud product, the identity of possible employment candidates can be sent to an HR department, opportunities can be provided to a CRM system, and product data/comments can be provided to ecommerce products and groups.

Another action that can performed is to assign action items and due dates based upon this data to key leaders in the organization (e.g., assign an action to marketing lead for internal communication strategy on key topics, assign action to HR lead for improving a key EE program, assign action to engineering to improve key metric, assign action to sales to share top number of wins and losses with key leaders, assigning an action to a recruiter).

Illustrative Example for Internal Social Network Content

The present invention can be applied to analyze and act upon any type of social data from any source of the data. In particular, embodiments of the invention can be applied to analyze and act upon both public and private sources of social media data. This portion of the disclosure describes an illustrative embodiment where the invention is applied to internal social network content.

As noted above, the present invention provides a mechanism to analyze and act upon data from social networks. This provides numerous advantages for an organization, since social networks have now become commonplace experiences for many individual that use the internet where as a routine matter of their daily activities on the internet, many users will regularly access and use public social networks to post content, convey thoughts, and engage in conversations.

For many enterprises and businesses, it would be very useful to be able leverage the capabilities of social networks to improve the way that the enterprises and businesses are run. However, given that social network is a relatively new phenomenon, conventionally most organizations have either ignored it or focused on the following aspects of social network:

1. Policies to prevent usage of social network by employees, except those involved with the organization own external social presence
2. Policies to improve customer relationship through the organization's social presence
3. Policies that allow use of social network, but prevent posting of anything work related Recently, organizations are starting to realize the value of an internal social network as a tool to improve collaboration within the organization. The internal social networks can be configured to provide an effective mechanism to allow users of the system to interact and collaborate with each other. For example, consider a CRM application, which is designed to facilitate the ability of a business to create, develop, and build relationships with its customers or potential customers—with the obvious intent to obtain or increases the business' sales to the customers. In this type of system, it would be very desirable to allow the internal users of an organization to use the internal social network to stay informed and collaborate for related business activities and customers/leads. An example internal social network is the Oracle Social Network product, available from Oracle Corporation of Redwood Shores, Calif.

The problem is that while some company executives may understand the value of internal social networks, others may not necessarily see its value or understand its benefits to the organization.

The present embodiment provides a method, system, and computer program product for semantically analyzing the content within an internal social network. Using the results of the analysis, the executives can gain a better understanding of, and insight into, the organization and its employees. A dashboard tool may be used in some embodiments of the invention to visualize the results of the semantic analysis. The invention provides numerous benefits and advantages. The invention provides an effective framework and execution path for organizations to enable, encourage, or monitor their internal social networks. In addition, the invention permits executives of the organization to directly derive value from a thriving internal social network. These benefits and values will help fund and grow the internal social networks as not only a collaboration tool, but also as a tool to align the organization.

Figure 5:
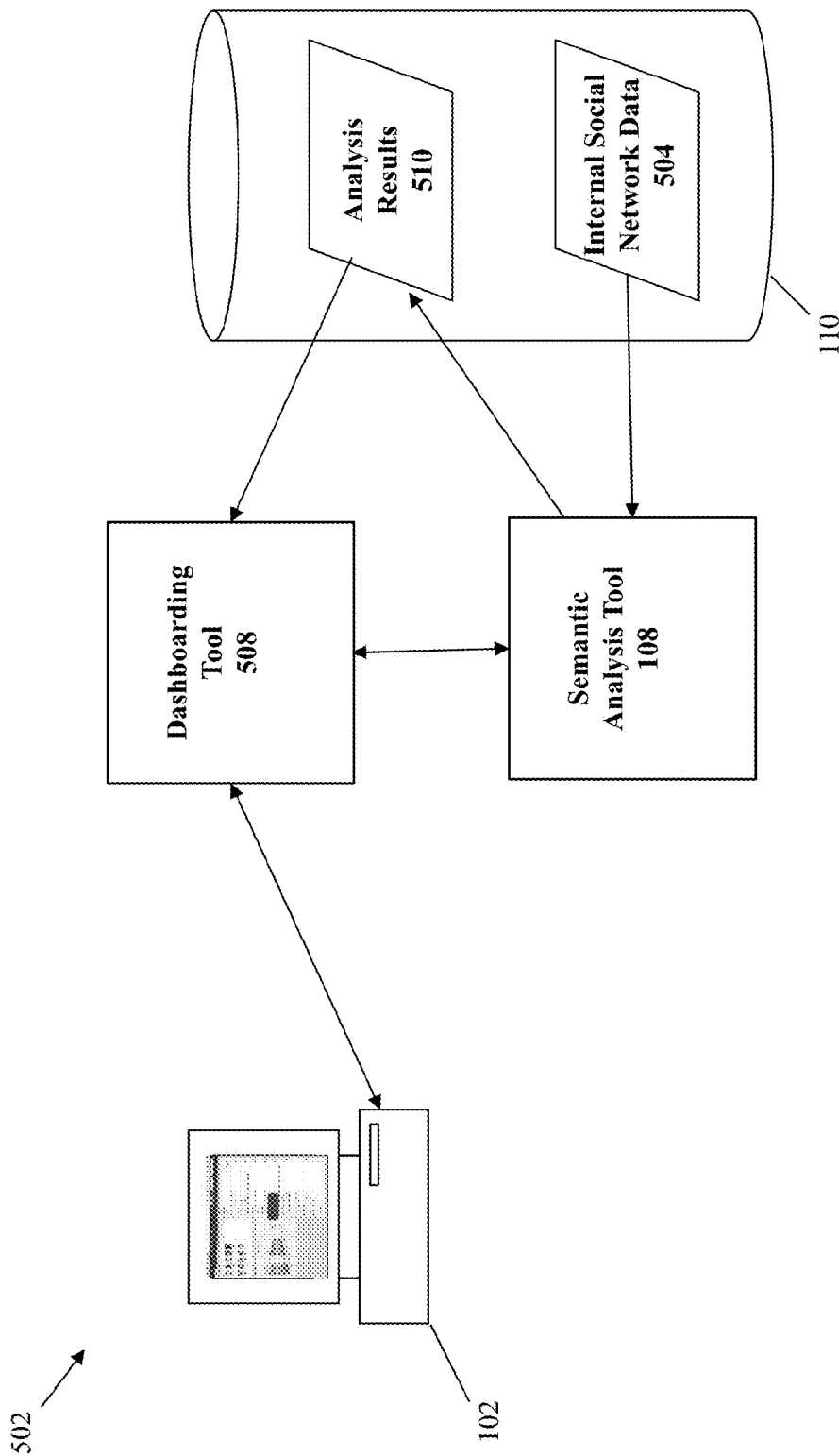
FIG. 5 illustrates an example system which may be employed in some embodiments of the invention to implement analysis of an internal social network.

FIG. 5 illustrates an example system 502 which may be employed in some embodiments of the invention to implement analysis of an internal social network. The system 502 includes one or more users at one or more user stations 102.

The data 504 operated upon by system 502 is content from an internal social network. The internal social network provides mechanisms and tools to permit members of an organization to interact and collaborate with each other. An example internal social network is the Oracle Social Network product, available from Oracle Corporation of Redwood Shores, Calif. The Oracle Social Network product provides a method by which users can create a 'conversation' that is associated with a business object. Users who are collaborating on the business object will document their discussion in the conversation. One example is discussion about new product design in the public cloud space. More details regarding an approach to implement an internal social network is described in co-pending U.S. application Ser. No. 13/622,071, filed on Sep. 20, 2012, entitled "Social Network System with Social Objects" and U.S. application Ser. No. 13/888,888, filed on May 7, 2013, entitled "Method and System for Integrating and Enterprise Application with a Social Networking Application", which are hereby incorporated by reference in their entirety.

The present embodiment is illustratively explained with reference to the Oracle Social Network. It is noted, however, that the invention is applicable to any internal social network, and indeed, has wide applicability in general to many types of organizational data. For example, internal company email and external social traffic may be semantically analyzed in similar ways to provide benefits to the organization. Therefore, the invention is not to be limited in its application to just to the Oracle Social Network.

A semantic analysis tool 108 is used to analyze the internal social network data, e.g., as described above with respect to FIGS. 1-4. Semantic analysis and filtering is performed upon the internal social network data to generate analysis results 510, which are stored into a database in a computer readable storage device 504.

Any suitable type of semantic analysis can be performed upon the internal social network data. For example, latent semantic analysis (LSA), an advanced form of statistical language modeling, can be used to perform semantic analysis upon the social data. This permits the system to understand the contextual and semantic significance of terms that appear within the social data. As a simple example semantic analysis can be used to understand the difference between the terms "Boss" when used to refer to a manager at work, when the "Boss" term is used to refer to a line of men's clothing, or where the term "The Boss" is used as the nickname for a certain well-known singer.

The system performs semantic analysis and classification to the internal social network data. This permits the system to create and apply filters to identify themes, and to cluster together like-minded messages, topics, conversations, and content for those themes. For example, the internal social network data can be analyzed to identify themes such as "compensation", "company performance and results", "company stock process", "acquisitions", "management policies", etc.

Therefore, there are numerous ways that can be taken to semantically categorize the internal social network content. The categorizations and classifications can be performed with an eye towards identifying themes and categories that would be of interest to the organization and its executives, with a particular focus on employee insights, preferences, and intentions and thoughts on industry, and category trends and emerging themes.

The analysis results can be used to identify topics that are considered to be of most importance to the employees, e.g., to identify the most popular topics on the internal social network. Furthermore, the invention can be used to determine whether there is a positive or negative sentiment about those topics. "Sentiment" refers to an opinion or feeling associated with a given item or type of content.

As noted above, employee profile data may also be accessed used as part of the analysis for the internal social network content. The profile data may also include, for example, demographic information about the originator of internal social network content, including information about the person's department, position, title, income, years of experience at the company, and geographic location. This profile data is useful for many purposes. For example, the profile data can be used to slice the analysis results by department, location, or other attributes, e.g., to understand better if certain sentiment is local or global.

Semantic filtering is a mechanism that is provided to minimize miss-categorizations of the social data. Semantic filtering is used to remove the irrelevant material from the social data to reduce the occurrence of false positives, false negatives, and inappropriate responses/rejections within the actionable data. This permits the resulting data to be more relevant and accurate when provided to the company executives.

In some embodiments, none of the internal social data is subject to semantic filtering. This embodiment is based on the assumption that the bulk of the internal social network content is likely to contain relevant data (in contrast to data from public social networks which likely contain an overwhelming quantity of irrelevant data). In an alternate embodiment, the internal social network data is subject to semantic filtering, particularly if past analysis shows the significant presence or quantity of irrelevant content among the raw internal social network data. In yet another embodiment, if the system is used to analyze both public and internal social network data, then either, or both the public and private social network data are subject to semantic filtering, but the filtering can be handled differently, e.g., so that greater levels/intensity of filtering are imposed on the public data as opposed to the internal data.

The analysis results 510 can be embodied as actionable social data in an actionable social message store, where tagging is implemented to tag the messages with appropriate tags. The tags correspond to areas of analytical importance with respect to the individuals or departments within an organization that will consume the results of the analysis. Therefore, the semantic analysis and classification activities will identify and associate tags to content from the internal social network as necessary to make sure the "actionable" content is appropriately handled by downstream reviewers.

The set of analysis results 510 can also be accessed and visually reviewed by individual and organizations within a company. In some embodiments, a dashboard tool 508 is used to access the analysis results. A "dashboard" is a user interface mechanism that is often used to provide views of key metrics and indicators relevant to a particular objective or business process. Therefore, dashboards typically use graphs, charts, and other visual objects to show summaries, trends, and comparisons of data. The dashboard can be configured to show analysis results of the internal social data that are needed to monitor the health and opportunities of the business, including for example, data that focus on high level measures of performance and forecasts. For analysis purposes, the dashboards often include more in the way of context data, comparisons, and history for the internal social data. The dashboards may also be used to monitor events and activities that are changing more often. The dashboards also may also support drilling down into the underlying details of the high level data. A suitable product that can be used in embodiments of the invention to provide dashboards is the Oracle BI (Business Intelligence) product, available from Oracle Corporation of Redwood Shores, Calif. In addition, set of analysis results 510 can also be automatically analyzed and processed using the workflow engine described above.

In some embodiments, the analysis results can be integrated with an enterprise application used by the organization. The enterprise application comprises any business-related application that provides visibility and control over various aspects of a business. Such enterprise/business applications can include, without limitation, Human resources ("HR") applications, customer relations management ("CRM") applications, enterprise resource planning ("ERP") applications, supply chain management applications, and other applications dealing with various finance, accounting, manufacturing, human resources, and/or distribution functions, to name but a few examples. For example, particular themes, sentiment, and content of importance to the human resources department may be sent as messages to be consumed by a HR computing system or department.

In one embodiment, tagged messages can be used to send the actionable content to the appropriate destination. For example, actionable social messages that are tagged as a "HR" can be directed to the human resources department to be handled by appropriate personnel to handle possible employee/employment issues. A user interface (e.g., Community Manager UX) can be provided to permit users to view and act upon the actionable social content. Using the Community Manager UX, a user can direct the flow of messages to appropriate personnel to take responsibility for performing pertinent actions with the messages in the actionable social message store.

The company management can take appropriate courses of action to address the identified content/topics from the internal social network. For example, the company executives can tailor communications to the employees (such as scheduling an All Hands meeting) to address the topics the employee base (e.g., department/location) considers important (e.g., most popular topics). As noted above, the identified content/topic can be identified from the dashboard. The identified content/topic can also be identified using the Community Manager UX and tags that are associated with the content.

As another example, the company management can use the analysis results to encourage and fuel momentum behind key projects. This is accomplished, for example, by finding where it has already taken hold and empowering those groups.

As yet another example, the invention can be used to make budget allocations, spot bonuses, or make other monetary decisions. This can be used to encourage momentum behind the topics that the executives considers important.

In addition, the organization and its management can look into negative sentiments around important initiatives. This is useful, for example, to figure out how to address those negatives sentiments and topics (e.g., by communication, restructuring, etc.).

Figure 6:
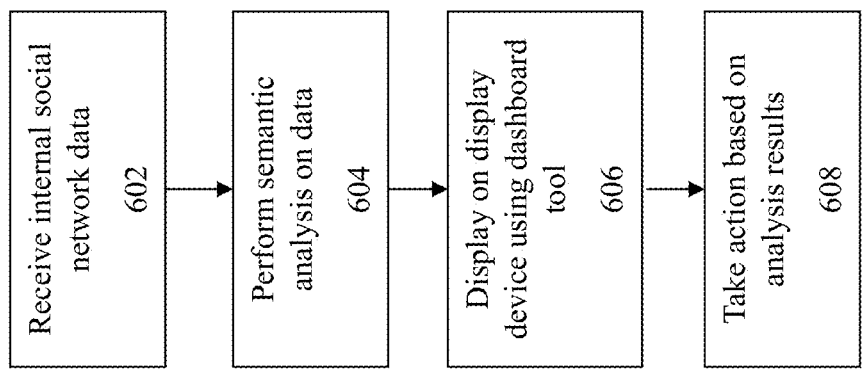
FIG. 6 shows a flowchart of an approach to implement some embodiments of the invention.

FIG. 6 shows a flowchart of an approach to implement some embodiments of the invention. At 602, the internal social data is received by the analysis system. As noted above, the internal social data may be received from any suitable internal social network. In some embodiments, the analysis can be performed based upon a combination of data from internal social networks as well as other sources of data, including public sources of social media data and email content.

At 604, semantic analysis and classification is performed on the social media data. This action is performed on a regular basis, e.g., to identify the most popular and most important topics discussed in the content within the internal social networks. Semantic filtering may also be applied to some or all of the social network data.

At 606, the analysis results are used to populate a dashboard with periodic statistics on the most popular and most important topics. The "importance" of topics sufficient to be displayed on the dashboard can be selected, for example, by the company executives. Using the dashboard, the executive can gain insight into: (a) What the employees consider most important (the most popular topics); (b) If there is positive and/or negative sentiment about the most important topics; and (c) Slice this data by department, location, or other attributes to understand better if a sentiment is local or global.

At 608, the company executives can then take actions appropriate to address the topics. Such actions include, for example: (a) Tailor communication to address the topics the employee base considers important; (b) Encourage and fuel momentum behind key projects by finding where it has already taken hold and empowering those groups; (c) Making budget allocations, spot bonuses, or other monetary decisions that encourage momentum behind the topics that the exec considers important; (d) Look into negative sentiments around important initiatives, and figure out how to address those (communication, restructuring, etc.).

Therefore, what has been described is an approach for implementing a system, method, and computer program product for allowing a business entity to access and integrate with social media data. The invention is capable of accessing data across multiple types of internet-based sources of social data and commentary and to perform semantic analysis upon that data.

System Architecture Overview

Figure 7:
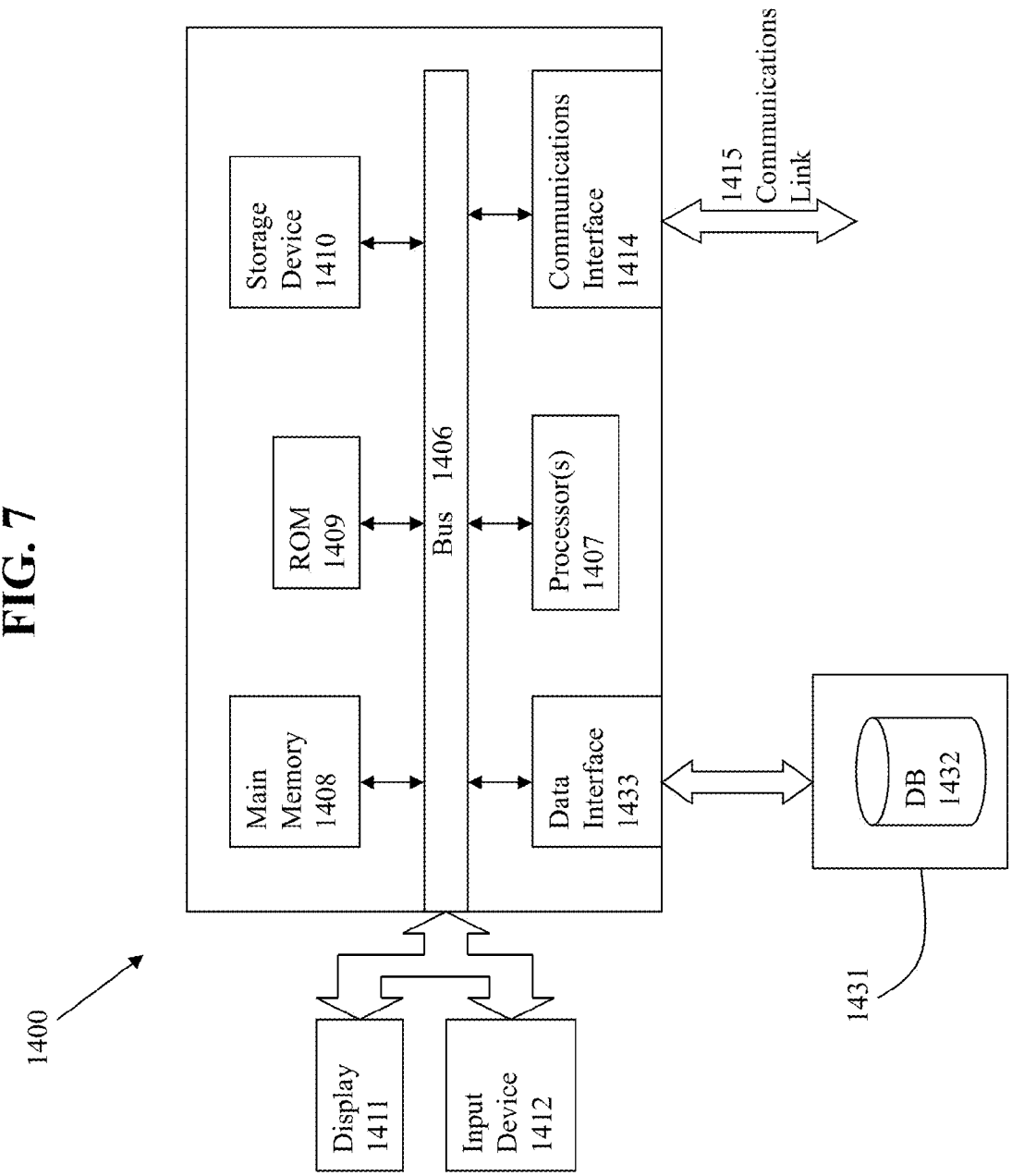
FIG. 7 shows an architecture of an example computing system with which the invention may be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor, comprising:
   identifying an internal social network for an enterprise;
   collecting a set of messages from the internal social network;
   performing semantic filtering to the set of messages, the semantic filtering reducing an excess noise associated with data that is not relevant to the enterprise;
   performing semantic analysis upon the set of messages collected from the internal social network to determine a contextual significance of one or more terms in the set of messages;
   identifying themes in the set of messages, the themes pertaining to at least one of customer preferences, demographic information, industry trends, customer view points;
   as a result of the performed semantic analysis, clustering together messages that are similar to each other;
   categorizing the set of messages into a plurality of categories based at least in part on the contextual significance of the one or more terms in the set of messages;
   associating each category of the plurality of categories with one or more tags;
   associating respective tags to the set of messages that are categorized as a result of the semantic analysis to generate a set of tagged messages;
   determining associations between the one or more tags and one or more enterprise applications corresponding to the enterprise such that the set of tagged messages are sent to respective ones of the one or more enterprise applications based at least in part on the determined associations; and
   storing the tagged messages in an actionable social message store, the actionable message store storing in a table format, for each message, one or more of a source of the message, a topic parameter associated with the message, data associated with the message, and the one or more tags associated with the message, wherein the semantic analysis performed comprises latent semantic analysis (LSA), the LSA referring to a form of statistical language modeling that distinguishes two identical words based on a semantic significance of the word.

2. The method of claim 1, further comprising displaying results of the semantic analysis on a dashboard tool.

3. The method of claim 1, in which results from performing the semantic analysis is used to gain insight into an organization or its employees.

4. The method of claim 1, in which the collected set of messages comprises business objects and conversations associated with the business objects.

5. The method of claim 1, in which the semantic analysis is performed in conjunction with filtering.

6. The method of claim 1, in which the semantic analysis comprises latent semantic analysis (LSA).

7. The method of claim 1, in which the semantic analysis identifies themes within the collected set of messages.

8. The method of claim 1, further comprising utilizing employee profile data to further analyze the collected set of messages.

9. The method of claim 1, wherein the one or more enterprise applications is a Human resources ("HR") application, customer relations management ("CRM") application, enterprise resource planning ("ERP") application, or supply chain management application.

10. The method of claim 1, further comprising utilizing results of the semantic analysis to tailor communications to employees.

11. The method of claim 1, further comprising utilizing results of the semantic analysis to make budget allocations, spot bonuses, or make other monetary decisions.

12. The method of claim 1, in which the semantic analysis identifies topics discussed in the collected set of messages within the internal social network.

13. The method of claim 1, in which the semantic analysis is used to identify employee sentiments.

14. A non-transitory computer readable medium having stored thereon a sequence of instructions which, when executed by a processor causes the processor to execute a process comprising:
   identifying an internal social network for an enterprise;
   collecting a set of messages from the internal social network;
   performing semantic filtering to the set of messages, the semantic filtering reducing an excess noise associated with data that is not relevant to the enterprise;
   performing semantic analysis upon the set of messages collected from the internal social network to determine a contextual significance of one or more terms in the set of messages;
   identifying themes in the set of messages, the themes pertaining to at least one of customer preferences, demographic information, industry trends, customer view points:
   as a result of the performed semantic analysis, clustering together messages that are similar to each other;
   categorizing the set of messages into a plurality of categories based at least in part on the contextual significance of the one or more terms in the set of messages;
   associating each category of the plurality of categories with one or more tags;
   associating respective tags to the set of messages that are categorized as a result of the semantic analysis to generate a set of tagged messages;
   determining associations between the one or more tags and one or more enterprise applications corresponding to the enterprise such that the set of tagged messages are sent to respective ones of the one or more enterprise applications based at least in part on the determined associations: and
   storing the tagged messages in an actionable social message store, the actionable message store storing in a table format for each message, one or more of a source of the message, a topic parameter associated with the message, data associated with the message, and the one or more tags associated with the message, wherein the semantic analysis performed comprises latent semantic analysis (LSAT), the LSA referring to a form of statistical language modeling that distinguishes two identical words based on a semantic significance of the word.

15. The computer readable medium of claim 14, wherein the sequence of instructions further comprises steps to display results of the semantic analysis on a dashboard tool.

16. The computer readable medium of claim 14, in which the collected set of messages comprises business objects and conversations associated with the business objects.

17. The computer readable medium of claim 14, in which the semantic analysis is performed in conjunction with filtering.

18. The computer readable medium of claim 14, in which the semantic analysis comprises latent semantic analysis (LSA).

19. The computer readable medium of claim 14, in which the semantic analysis identifies themes within the collected set of messages.

20. The computer readable medium of claim 14, wherein the sequence of instructions further comprises steps to utilize employee profile data to further analyze the collected set of messages.

21. The computer readable medium of claim 14, wherein the sequence of instructions further comprises steps to utilize results of the semantic to tailor communications to employees.

22. The computer readable medium of claim 14, wherein the sequence of instructions further comprises steps to utilize results of the semantic analysis to make budget allocations, spot bonuses, or make other monetary decisions.

23. The computer readable medium of claim 14, in which the semantic analysis identifies topics discussed in the collected set of messages within the internal social network.

24. The computer readable medium of claim 14, wherein the sequence of instructions further comprises steps to utilize results of the semantic analysis to identify employee sentiments.

25. A system, comprising:
a processor;
a memory comprising computer code executed using the processor, in which the computer code implements a process for, identifying an internal social network for an enterprise, collecting a set of messages from the internal social network, performing semantic filtering to the set of messages, the semantic filtering reducing an excess noise associated with data that is not relevant to the enterprise, performing semantic analysis upon the set of messages collected from the internal social network to determine a contextual significance of one or more terms in the set of messages, identifying themes in the set of messages, the themes pertaining to at least one of customer preferences, demographic information, industry trends, customer view points, as a result of the performed semantic analysis, clustering together messages that are similar to each other, categorizing the set of messages into a plurality of categories based at least in part on the contextual significance of the one or more terms in the set of messages, associating each category of the plurality of categories with one or more tags, associating respective tags to the set of messages that are categorized as a result of the semantic analysis to generate a set of tagged messages, determining associations between the one or more tags and one or more enterprise applications corresponding to the enterprise such that the set of tagged messages are sent to respective ones of the one or more enterprise applications based at least in part on the determined associations, and storing the tagged messages in an actionable social message store, the actionable message store storing in a table format, for each message, one or more of a source of the message, a topic parameter associated with the message, data associated with the message, and the one or more tags associated with the message, wherein the semantic analysis performed comprises latent semantic analysis (LSA), the LSA referring to a form of statistical language modeling that distinguishes two identical words based on a semantic significance of the word.

26. The system of claim 25, further comprising a dashboard tool to visualize results from performing the semantic analysis.

27. The system of claim 25, in which the collected set of messages comprises business objects and conversations associated with the business objects.

28. The system of claim 25, in which the semantic analysis is performed in conjunction with filtering.

29. The system of claim 25, in which the semantic analysis comprises latent semantic analysis (LSA).

30. The system of claim 25, in which employee profile data is used to analyze the collected set of messages.

31. The system of claim 25, in which analysis results are used by company management to tailor communications to employees.

32. The system of claim 25, in which analysis results are used by company management to make budget allocations, spot bonuses, or make other monetary decisions.

33. The system of claim 25, in which the semantic analysis identifies topics discussed in the collected set of messages within the internal social network.

34. The system of claim 25, in which the semantic analysis is used to identify employee sentiments.

* * * * *